United States Patent
Louch et al.

(10) Patent No.: US 11,074,116 B2
(45) Date of Patent: Jul. 27, 2021

(54) DIRECT INPUT FROM A REMOTE DEVICE

(71) Applicant: Apple Inc., Cupertino, CA (US)

(72) Inventors: John O. Louch, Boulder, CO (US);
Kevin J. Van Vechten, Montecito, CA (US); Christopher N. Ryan, Windham, NH (US); John J. Iarocci, Los Gatos, CA (US); Bob Bradley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,482

(22) Filed: Sep. 28, 2018

(65) Prior Publication Data

US 2019/0370092 A1 Dec. 5, 2019

Related U.S. Application Data

(60) Provisional application No. 62/679,602, filed on Jun. 1, 2018.

(51) Int. Cl.
*G06F 3/0482* (2013.01)
*G06F 9/54* (2006.01)
(Continued)

(52) U.S. Cl.
CPC .......... *G06F 9/543* (2013.01); *G06F 3/03545* (2013.01); *G06F 3/0482* (2013.01);
(Continued)

(58) Field of Classification Search
CPC .................................................. G06F 3/0482
(Continued)

(56) References Cited

U.S. PATENT DOCUMENTS 6,643,721 B1 * 11/2003 Sun .................. G06F 3/038
710/10
8,200,703 B2 * 6/2012 Sattler .................. G06F 40/174
707/793

(Continued)

FOREIGN PATENT DOCUMENTS

EP 2648427 10/2013
WO WO 2014/039293 3/2014

OTHER PUBLICATIONS

Camarda, Special Edition Using Microsoft Office Word 2003, Que Publishing, copyright 2004, p. 442.

(Continued)

*Primary Examiner* — Daniel Rodriguez
(74) *Attorney, Agent, or Firm* — Morgan, Lewis & Bockius LLP

(57) ABSTRACT

The subject technology provides a system of devices, at least one of which includes an application configured to receive data directly from another one of the devices. The application is configured to obtain a list of available devices and associated features and provide input options for display based on the list. When one of the input options is selected, the application activates a component and/or an application of the other device for generation of the desired data. When the desired data has been generated by the other device, the generated data is directly input from the other device into the limiting application, without storage of the generated data at the other device, and without operation of the same application on the other device.

22 Claims, 10 Drawing Sheets

(51) Int. Cl.
*G06F 3/14* (2006.01)
*G06F 3/0354* (2013.01)
*G06F 3/0488* (2013.01)
*G06F 3/0484* (2013.01)
*G06F 16/11* (2019.01)
*G06F 40/117* (2020.01)
*G06F 40/166* (2020.01)

(52) U.S. Cl.
CPC ...... *G06F 3/04842* (2013.01); *G06F 3/04845* (2013.01); *G06F 3/04883* (2013.01); *G06F 3/04886* (2013.01); *G06F 3/1454* (2013.01); *G06F 16/122* (2019.01); *G06F 40/117* (2020.01); *G06F 40/166* (2020.01)

(58) Field of Classification Search
USPC ......................................................... 715/770
See application file for complete search history.

(56) References Cited

U.S. PATENT DOCUMENTS

| | | | | |
|---|---|---|---|---|
| 8,209,183 | B1* | 6/2012 | Patel | G06K 9/72 704/270 |
| 9,024,995 | B2* | 5/2015 | Gava | H04N 21/4223 348/14.01 |
| 9,025,066 | B2* | 5/2015 | Muhrke | H04N 5/23293 348/333.01 |
| 9,176,942 | B1 | 11/2015 | McLaughlin | |
| 9,769,227 | B2* | 9/2017 | Threlkeld | H04L 65/4076 |
| 9,798,706 | B2* | 10/2017 | Wu | G06T 11/60 |
| 9,865,262 | B2* | 1/2018 | Varthakavi | G06F 16/335 |
| 9,959,018 | B2* | 5/2018 | Ryu | H04L 67/08 |
| 2001/0025326 | A1* | 9/2001 | Kizaki | H04N 1/00326 710/100 |
| 2001/0048447 | A1* | 12/2001 | Jogo | G06F 3/0481 345/620 |
| 2002/0078293 | A1* | 6/2002 | Kou | G06F 13/4291 710/305 |
| 2005/0071297 | A1* | 3/2005 | Kara | G07B 17/00508 705/410 |
| 2005/0146634 | A1 | 7/2005 | Silverstein | |
| 2005/0149564 | A1 | 7/2005 | Jain | |
| 2005/0273219 | A1 | 12/2005 | Kitao | |
| 2006/0064686 | A1* | 3/2006 | Demuth | G06F 8/61 717/175 |
| 2006/0105712 | A1* | 5/2006 | Glass | G06F 21/35 455/41.2 |
| 2006/0209016 | A1* | 9/2006 | Fox | G06F 3/0481 345/156 |
| 2006/0285164 | A1* | 12/2006 | Wang | G06T 15/503 358/3.01 |
| 2008/0119235 | A1* | 5/2008 | Nielsen | G06F 40/103 455/566 |
| 2009/0210932 | A1* | 8/2009 | Balakrishnan | H04W 4/02 726/5 |
| 2009/0282330 | A1* | 11/2009 | Hines | G06F 3/0485 715/700 |
| 2009/0282350 | A1* | 11/2009 | Kawasaki | H04N 21/431 715/764 |
| 2010/0053342 | A1* | 3/2010 | Hwang | H04N 5/2259 348/207.99 |
| 2010/0082821 | A1* | 4/2010 | Rosenblatt | G06F 9/54 709/228 |
| 2010/0245294 | A1* | 9/2010 | Piersol | G06F 3/0416 345/179 |
| 2011/0058052 | A1 | 3/2011 | Bolton et al. | |
| 2011/0072029 | A1* | 3/2011 | Hedloy | G06F 3/04842 707/758 |
| 2011/0074667 | A1* | 3/2011 | Robinson | G09B 7/02 345/156 |
| 2011/0074679 | A1* | 3/2011 | West, Jr. | G06F 3/0346 345/163 |
| 2012/0084792 | A1 | 4/2012 | Benedej et al. | |
| 2012/0233535 | A1* | 9/2012 | Piersol | G06F 40/197 715/234 |
| 2012/0326834 | A1 | 12/2012 | Kennedy | |
| 2013/0120249 | A1* | 5/2013 | Im | G06F 3/011 345/157 |
| 2013/0120602 | A1* | 5/2013 | Huang | H04N 5/232935 348/218.1 |
| 2013/0132081 | A1* | 5/2013 | Ryu | H04N 21/25808 704/235 |
| 2013/0222627 | A1* | 8/2013 | Earnshaw | H04N 1/00204 348/211.2 |
| 2013/0293492 | A1* | 11/2013 | Weber | G09G 5/12 345/173 |
| 2014/0006490 | A1* | 1/2014 | Setlur | G06F 21/10 709/204 |
| 2014/0007123 | A1* | 1/2014 | Yuan | G06F 3/048 718/103 |
| 2014/0059644 | A1* | 2/2014 | Shin | H04L 63/0861 726/2 |
| 2014/0062962 | A1* | 3/2014 | Jang | G06K 9/2081 345/175 |
| 2014/0071039 | A1* | 3/2014 | Saiki | G06F 3/04883 345/156 |
| 2014/0112571 | A1* | 4/2014 | Viera | G06Q 40/12 382/138 |
| 2014/0139470 | A1* | 5/2014 | Li | G06F 3/0412 345/173 |
| 2014/0376042 | A1* | 12/2014 | Kawabata | H04N 1/00217 358/1.15 |
| 2015/0020013 | A1 | 1/2015 | Kim | |
| 2015/0110404 | A1* | 4/2015 | Cho | G06T 5/003 382/195 |
| 2015/0126121 | A1* | 5/2015 | Noh | H04W 8/005 455/41.2 |
| 2015/0350355 | A1 | 12/2015 | Linn et al. | |
| 2016/0063036 | A1* | 3/2016 | Kawai | G06F 16/5866 345/173 |
| 2016/0065830 | A1* | 3/2016 | Ishizu | H04W 4/80 348/207.11 |
| 2016/0065845 | A1* | 3/2016 | Tokunaga | G06F 3/0482 348/207.11 |
| 2016/0065887 | A1* | 3/2016 | Ishizu | H04N 5/23206 348/231.6 |
| 2016/0085654 | A1* | 3/2016 | Khoury | G06F 13/10 710/17 |
| 2016/0241905 | A1* | 8/2016 | Gao | G06F 3/0482 |
| 2016/0249006 | A1* | 8/2016 | Park | H04N 21/482 |
| 2016/0259413 | A1* | 9/2016 | Anzures | G06F 3/0481 |
| 2016/0308917 | A1* | 10/2016 | Veeramani | G06F 3/0383 |
| 2016/0371885 | A1* | 12/2016 | Gavriliuc | G06F 3/017 |
| 2017/0113142 | A1* | 4/2017 | Miyamae | A63F 13/35 |
| 2017/0205980 | A1* | 7/2017 | Rainisto | G06F 3/0484 |
| 2017/0243560 | A1* | 8/2017 | Donelli | G06F 3/1462 |
| 2017/0245147 | A1* | 8/2017 | Liu | G06F 1/1698 |
| 2017/0295311 | A1* | 10/2017 | Tokunaga | H04N 1/00281 |
| 2017/0318146 | A1* | 11/2017 | Peter | H04M 1/72421 |
| 2018/0020495 | A1* | 1/2018 | Nakayama | H04W 12/06 |
| 2018/0124304 | A1* | 5/2018 | Niemeyer | H04N 5/23293 |
| 2018/0225263 | A1* | 8/2018 | Zhong | G06F 40/166 |
| 2018/0227341 | A1* | 8/2018 | Rizzi | H04L 65/403 |
| 2018/0288130 | A1* | 10/2018 | Sandfort | H04L 67/10 |
| 2018/0314546 | A1* | 11/2018 | Hirose | G06F 9/4411 |
| 2018/0364813 | A1* | 12/2018 | Sayah | H04M 1/724 |
| 2019/0007596 | A1* | 1/2019 | Watanabe | H04N 5/23229 |
| 2019/0164322 | A1* | 5/2019 | Kong | G06T 7/194 |
| 2019/0253499 | A1* | 8/2019 | Ferrara | H04L 51/046 |

OTHER PUBLICATIONS

International Search Report and Written Opinion from PCT/US2019/034727, dated Sep. 10, 2019, 15 pages.

(56) References Cited

OTHER PUBLICATIONS

Second Written Opinion of the International Preliminary Examining Authority from PCT/US2019/034727, dated Aug. 14, 2020, 10 pages.

* cited by examiner

DIRECT INPUT FROM A REMOTE DEVICE

CROSS-REFERENCE TO RELATED APPLICATIONS

The present application claims the benefit of U.S. Provisional Patent Application Ser. No. 62/679,602, entitled "Direct Input from a Remote Device" filed on Jun. 1, 2018, which is hereby incorporated by reference in its entirely for all purposes.

TECHNICAL FIELD

The present description relates generally to communication between electronic devices, and more particularly to direct input from a remote device.

BACKGROUND

Electronic devices such as laptops, tablet devices, and smartphones often include applications for content editing. Content-editor applications can include word processing applications, presentation editing applications, messaging applications, and electronic mail applications. Users may use the content-editor applications to create and edit content, such as documents, presentations, etc. For example, a user may use a word processing application to create a document and may insert text, images, and the like to the document.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
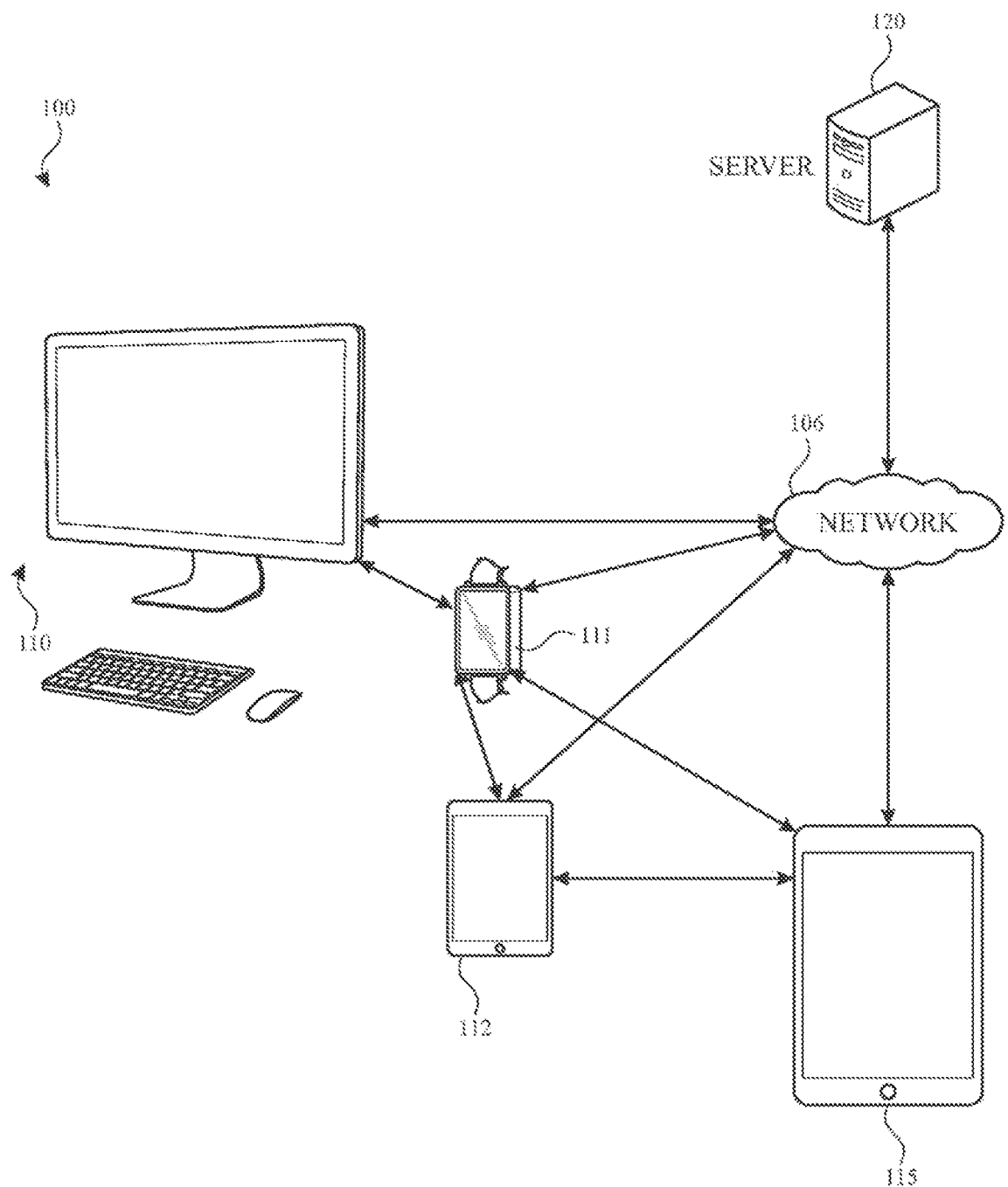
FIG. 1 illustrates an example network environment in which direct input from remote devices may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Applications for electronic devices may include content-editor applications, file-manager applications, and other applications that provide a user-interface (UI) view to be displayed on a display of the electronic device. Content-editor applications for electronic devices allow alphanumeric characters, images, videos, animations, health data, drawing input, and/or other data or content to be input or inserted into a document, presentation, an electronic message, electronic mail, spreadsheet, filesystem file or folder, or any other editable container. The alphanumeric characters are input into the container using a physical or display-represented keyboard, drawing input (e.g., handwritten characters and/or freehand sketch images) to a touchscreen or touchpad, or audio input (e.g., using voice recognition software). Other input such as images, videos, and animations is typically inserted into the container by selecting a file containing the images, videos, or animations and stored on the same device on which the content-editor application is running, or dragging a file into the container.

File-manager applications can provide a file-manager UI view for viewing the contents of folders on a filesystem, including lists or icons representing files stored on a filesystem (e.g., stored in memory) of the electronic device. The file-manager UI view may include navigation options for selecting and/or finding a desired filesystem folder. When the file-manager UI view is displayed, files can be dragged and dropped into or out of a displayed filesystem folder. In some scenarios, it may be desirable to provide input (e.g., content, data, metadata, or the like) directly into a filesystem file or folder (e.g., without opening the filesystem file or folder). Other applications may include internet browser applications, social media applications, media player applications, device background applications, banking or payment applications, navigation applications, ridesharing applications, or any other applications that may provide a UI view. The UI view of an application may be modified based on input (e.g. data, content, or metadata) from a sensor or camera (e.g., based on a mood of the user as determined using one or more images of the user and/or health/activity data for the user).

However, in some cases, the device on which the application is running may not be the device most suited to generating or inputting the desired data or content. For example, if a user is writing a report on juggling, using a content-editor application such as a word processor application or a presentation editor application running on the user's desktop computer, the user may desire to capture an image of a set of juggling balls near the user's desktop for insertion into the report. Although the desktop computer may have a camera (e.g., for video conferencing), it can be unwieldy or impossible to lift and turn the desktop computer to capture the image of the juggling balls.

In many cases, the user of the desktop also has easy access to a smartphone, a tablet device, or a wearable device that is more easily manipulable and/or maneuverable for capturing an image. However, in these circumstances, the user commonly must access a camera application on the smartphone or tablet or wearable device, capture the image, store the image locally on the smartphone or tablet, exit the camera application, open a photo viewing, messaging, or email application, select the stored captured, image and send the stored captured image in a text message or an email to the desktop. The user then must exit the content-editor application, open a messaging application or email application on the desktop, access the message or email, and obtain the captured image front the message or email for either local storage on the desktop for insertion or for insertion from the received message or email.

This process can be time-consuming inefficient, and disruptive to the workflow of preparing a report, and fails to leverage the processing and component power of all of the devices in a system.

In another example, the user may desire to markup or annotate an image stored on the electronic device. In this example, the image may be stored on a desktop computer and the user may have access to a tablet device having a stylus and a touchscreen that is better suited to markup of the stored image than the input devices of the desktop computer. In this example, it may be desirable to be able to view and markup the image (e.g., using drawing input with the stylus and/or touchscreen) on the tablet device, and provide the markup (e.g., a marked-up image or metadata for rendering of the markup at the desktop) for direct input to the image stored on the desktop (e.g., without storing the image or the markup at the tablet device).

In another example, a user may desire to set a theme (e.g., a color or other display theme for the borders, edges, background, or other portions) of a UI view of an application based on the user's mood, however, the user's device may lack the capability to determine mood and/or may lack sensors to capture information indicative of mood. In this example, it may be desirable to be able to use the camera and/or biometric sensors (e.g., heartrate sensors, motion sensors, cameras with associated with AR data capabilities for identifying facial features and/or expressions, temperature sensors, thermostats, and/or the like) of another device such as a smartphone or a smart watch to obtain mood metadata (e.g., metadata including mood indicating information from the other device and/or including facial point mapping data or sensor data for determination of mood at the user's (primary) device) for direct input to the application with the UI view mood option. In another example, the user may desire to input health data or activity data from a smart watch into a health monitoring application or activity monitoring application on a tablet device or a smartphone.

The subject technology provides systems of devices, each communicatively accessible by an application on one of the devices, so that the application on one device (e.g., a primary device) can utilize components and/or applications on other devices in the system for generating and inputting desired data streams, metadata, or content (e.g., without requiring local storage at the other device of content or data generated by that device, without requiring secure access to personal data of the other device, and without requiring switching to any other application on the primary device on which the application is running).

As used herein, a primary device may be a device such as a desktop computer, a server terminal, a smartphone, a laptop, a wearable device such as a smartwatch, or any other computing device on which an application is being executed or for which data or content from another device is desired. The primary device may sometimes be referred to herein as a "device" or a "first device". As used herein, a secondary device may be a device such as a desktop computer, a server terminal, a smartphone, a laptop, a wearable device such as a smartwatch or another activity or fitness tracking wearable device, exercise equipment having one or more sensors, or any other computing device having one or more applications and/or one or more components (e.g., cameras, keyboards, touchscreens, stylus devices, etc.) that can be activated by the application on the primary device to generate data or content at the secondary device for direct insertion from the secondary device into the application on the primary device (e.g., without storing the data or content on the secondary device and without operating the same application on the secondary device).

The secondary device may sometimes be referred to herein as a "remote device" or a "second device". Although the second device is sometimes described herein as a remote device that is disposed in a separate housing or enclosure from the housing or enclosure of the first device, the second device may in some implementations be a second device that is disposed within a common housing or enclosure with the first device (e.g., the subject technology can be applied for intra-device scenarios in addition to the inter-device scenarios generally described herein as examples). The second device may be paired, unpaired, and/or communicatively coupled to the primary device by a wired (e.g., universal serial bus or the like) or wireless (e.g., near-field communications, Bluetooth, WiFi, a combination of these and/or any other communications protocols and/or hardware and/or combinations thereof) connection.

It should be appreciated that a primary device in one operational scenario can be used as a secondary device in another operational scenario, and a secondary or remote device in one operational scenario can be used as a primary device in another operational scenario. As described in further detail hereinafter, the application on the primary device can sort available secondary or remote devices by the input features on that device so that the user (or the application) can choose the device best suited to generate and input any particular type of data or content desired by the user. In some examples, particular devices can be white listed to be used together, or black listed to not be. For example, user preferences can be set at the primary and/or secondary device to selectively turn on or turn off (e.g., block) the capabilities of that device from being used for direct input to another device. In another example, a user may set up (e.g., white list) as set of known (and/or trusted) devices that can be used for obtaining and/or exchanging data or content for direct input to an application.

The primary and secondary devices can be communicatively coupled by wired or wireless communications such as Bluetooth or other direct peer-to-peer communications, communications via a local area network, or over wider-area networks such as the Internet. The primary and secondary devices can be communicatively coupled when each is aware of the availability of the other for communication and a least one is aware of the features available on the other device, although the devices may not be in continuous communication (e.g., if one or more of the devices is in a low-power or intermittent-polling mode.

Thus, the subject technology provides a more effective and efficient system of electronic devices, e.g., as compared to individual devices with existing content-editor applications and input components as described above.

FIG. 1 illustrates an example network environment 100 in which direct input of data or content to a first device from a second device may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 112, an electronic device 115, and a server 120. The network 106 may communicatively (directly or indirectly) couple the electronic device 110 and/or the server 120, the electronic device 112 and/or the server 120, the electronic device 115 and/or the server 120, electronic device 110 and/or the electronic device 112, electronic device 112 and/or the electronic device 115, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 112, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be and/or may include all or part of, the electronic system discussed below with respect to FIG. 10. In one or more implementations, the electronic device 110 may include a camera (e.g., one or more images sensors and one or more lenses, filters, actuators, associated electronics, and/or other camera components) and a keyboard, and may provide an application such as a content-editor application, a file manager application, or other applications arranged to cooperate with components of electronic device 111, electronic device 112 and/or electronic device 115 to provide input to the application (e.g., directly over a wired or wireless peer-to-peer connection or over the network 106 with electronic device 111, electronic device 112 and/or electronic device 115).

The electronic device 112 may include a touchscreen, a camera, a microphone and/or other components and may be, for example, a portable computing, device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. Electronic device 112, may include motion sensors such as gyroscopes, accelerometers, global positioning system (GPS) components, magnetic sensors such as compasses, and the like, and may be, for example, a smart phone or media player device. The camera may include or have associated augmented reality circuitry or software for determining depth in capture images or video streams and/or identifying facial features and/or expressions.

In one or more implementations, the electronic device 112 may not include a touchscreen but may support touchscreen-like gestures, such as in a virtual reality or augmented reality environment. In one or more implementations, the electronic device 112 may include a touchpad. In FIG. 1, by way of example, the electronic device 112 is depicted as a smartphone with a touchscreen. In one or more implementations, the electronic device 112 may be, and/or may include all or part of the electronic system discussed below with respect to FIG. 10. In one or more implementations, the electronic device 112 may include a camera, a touchscreen, and a microphone, and may provide an application such as a content-editor application, a file manager application, or other applications arranged to cooperate with components of electronic device 110, electronic device 111, and/or electronic device US to provide input to the application (e.g., directly over a wired or wireless peer-to-peer connection or over the network 106 with electronic device 110, electronic device 111, and/or electronic device 115).

The electronic device 115 may include a touchscreen, a camera, a microphone and/or other components or peripheral devices such as a stylus input device and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. Electronic device 115, may include motion sensors such as gyroscopes, accelerometers, global positioning system (GPS) components, magnetic sensors such as compasses, and the like, and may be, for example, a portable computing device such as a tablet device or a laptop computer. The camera may include or have associated augmented reality circuitry or software for determining depth in capture images or video streams and/or identifying facial features and/or expressions.

In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a tablet device with a touchscreen. In one or more implementations, the electronic device 115 may be, and/or may include all or part of the electronic system discussed below with respect to FIG. 10. In one or more implementations, the electronic device 115 may include a camera, a touchscreen, a microphone, and a stylus input device, and may provide an application such as a content-editor application, a file manager application, or other applications arranged to cooperate with components of electronic device 110, electronic device 111, and/or electronic device 112 to provide input to the application (e.g., directly over a wired or wireless peer-to-peer connection or over the network 106 with electronic device 110, electronic device 111, and/or electronic device 112).

The electronic device 111 may include a touchscreen, a camera, a microphone and/or other components (e.g., health sensors such as a heart rate sensor or electro-cardio sensor), motion sensors such as gyroscopes, accelerometers, global positioning system (GPS) components, magnetic sensors such as compasses, and the like, and may be, for example, a wearable computing device such as a smart watch. The camera may include or have associated augmented reality circuitry or software for determining depth in captured images or video streams and/or identifying facial features and/or expressions. In one or more implementations, the electronic device 111 may not include a touchscreen but may support touchscreen-like gestures, such as in a virtual reality or augmented reality environment.

In FIG. 1, by way of example, the electronic device 111 is depicted as a smart watch with a touchscreen. In one or more implementations, the electronic device 111 may be, and/or may include all or part of the electronic system discussed below with respect to FIG. 10. In one or more implementations, the electronic device 111 may include a camera, a touchscreen, and a microphone, and may provide an application such as a content-editor application, a file manager application, or other applications arranged to cooperate with components of electronic device 110, electronic device 112, and/or electronic device 115 to provide input to the application (e.g., directly over a wired or wireless peer-to-peer connection or over the network 106 with electronic device 110, electronic device 112, and/or electronic device 115).

In one or more implementations, the server 120 manages secure exchange of data between electronic devices 110, 111, 112, and/or 115. However, it should be appreciated that electronic devices 110, 111, 112, and/or 115 can exchange data directly (e.g., without network 106 or server 120) using wireless near-field communications (NFC) signals such as Bluetooth signals, direct WiFi signals, and/or wired connections. For example, each of electronic devices 110, 111, 112, and 115 may include circuitry (e.g., an application programming interface (API)) that searches for, identifies, and stores identifiers for devices that are available for communications with that device. Devices that are available for communications with a particular device may be nearby devices that are within a range of NFC or direct WiFi communications with the particular device and/or common-user devices such devices registered to a common user account (e.g., with server 120).

The API may be used 10 store a list of a user's own devices (e.g., devices registered at server 120 to that user's account) that are accessible to each other whether or not those devices are in close proximity and/or a list of devices that are in close proximity to each other whether or not they are registered to the same user account. In this way, a system of devices that are in short-range communications range can be communicatively coupled regardless of the owner of the device and/or a system of devices registered to a common owner or set of owners and connected to server 120 can be communicatively coupled regardless of proximity. In some scenarios, only devices in close proximity that are registered to a common user may be included in the list of available devices.

The API of each device may also be used to identify features of that device (e.g., components of the device such as a camera, a touchscreen or touch pad, a microphone, or a stylus input device). The API may be used to store, for each device in the list of available devices, a list of the identified available features.

For example, each of electronic devices 110, 111, 112, and 115 may periodically transmit or broadcast advertising signals (e.g., using a Bluetooth Low Energy, NFC protocols, or other wireless communications protocols) that indicate the presence of that device and/or feature flags that indicate available features of that device. For example a device may advertise a feature flag that indicates that the device has an available camera, stylus, touchscreen, sensor, or the like that can be used to provide input to other (e.g., remote) devices. The feature flags can be advertised together with general presence-indicating advertising signals of an electronic device, or the feature flags can be advertised once a trusted remote device is identified and communication is established with that trusted device. Trusted devices may be devices that are paired with the device (e.g. via a Bluetooth communications exchange), devices that are communicatively coupled to a common network such as a common WiFi network with the device, and/or devices that are registered to a common user account (e.g., as verified by communications between an account server, the device, and the misted device). Feature flags may be broadcast by default or feature flags may only be broadcast for individual features or sets of features that have been enabled for remote use (e.g., by a user of the device).

An API such as API 208 and/or an application such as a content-editor application, a file manager application, or another application on one device may store information indicating devices that are available for providing direct input to that device and/or available features of the devices that are available. The device may maintain a communicative connection with one or more of the available devices or may disconnect while (e.g., periodically) maintaining a trust relationship (such as a pairing) for rapid reconnection if a request to utilize a feature of one device is received at another device.

Devices may be removed from the available-device list on another device when they are carried away from the other device, logged out of a user account (e.g., an account associated with the other device), blocked from access by a user of the device, or disconnected from a common network with the other device (as examples).

Figure 2:
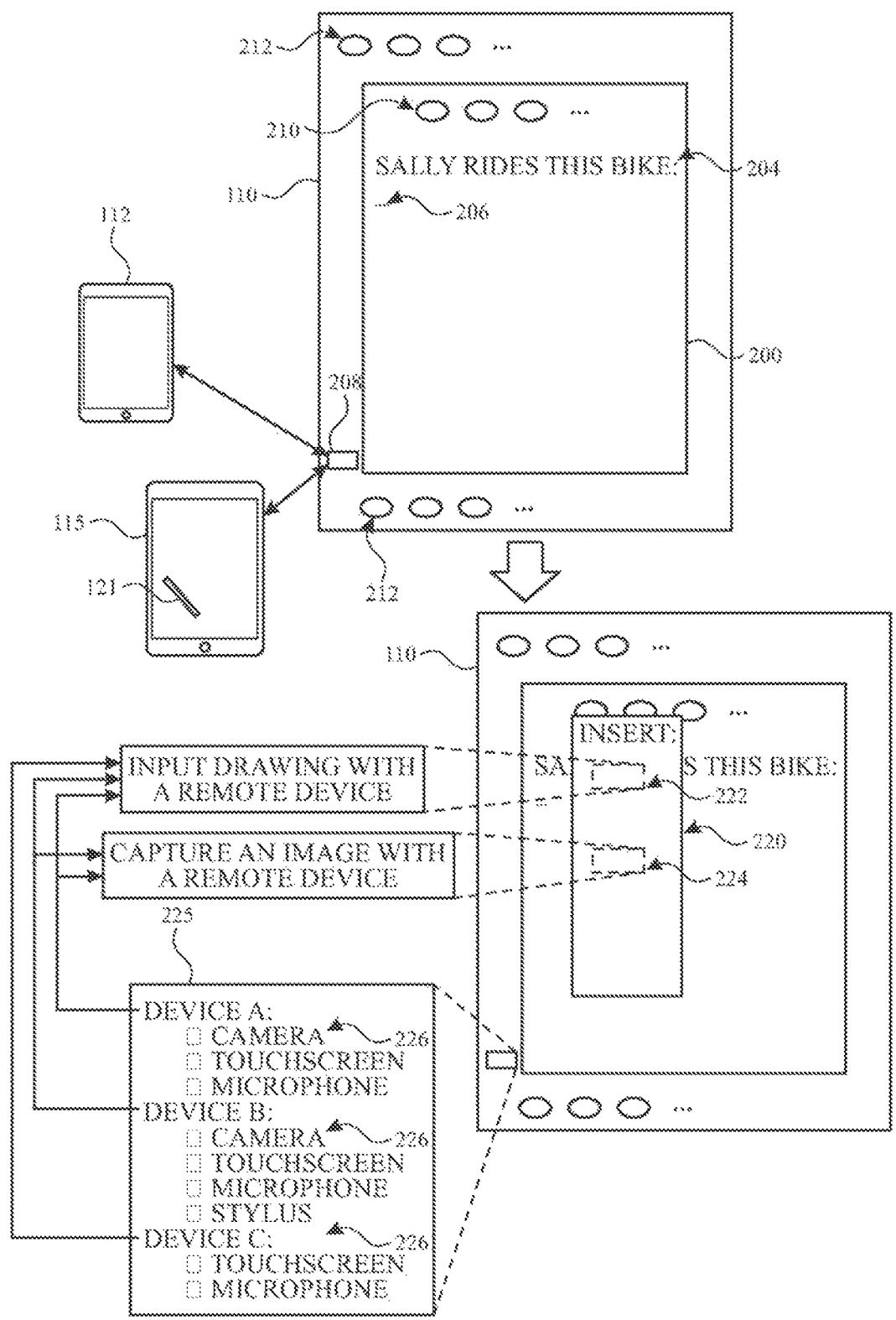
FIG. 2 illustrates a schematic diagram showing exemplary user interface views for a content-editor application with remote input options in accordance with one or more implementations.
Figure 3:
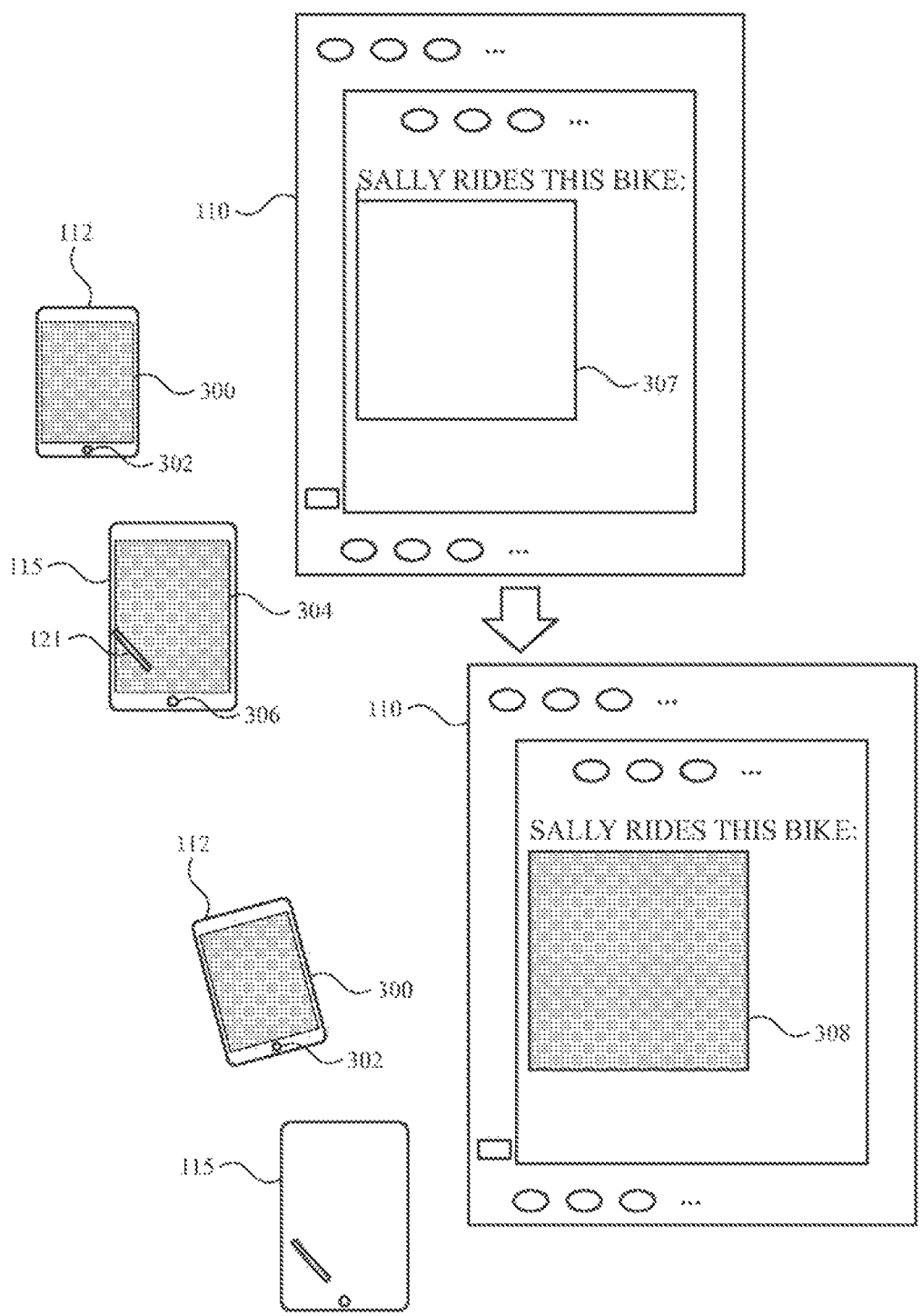
FIG. 3 illustrates a schematic diagram showing exemplary user interface views for a content-editor application after selection of a remote input option in accordance with one or more implementations.
Figure 4:
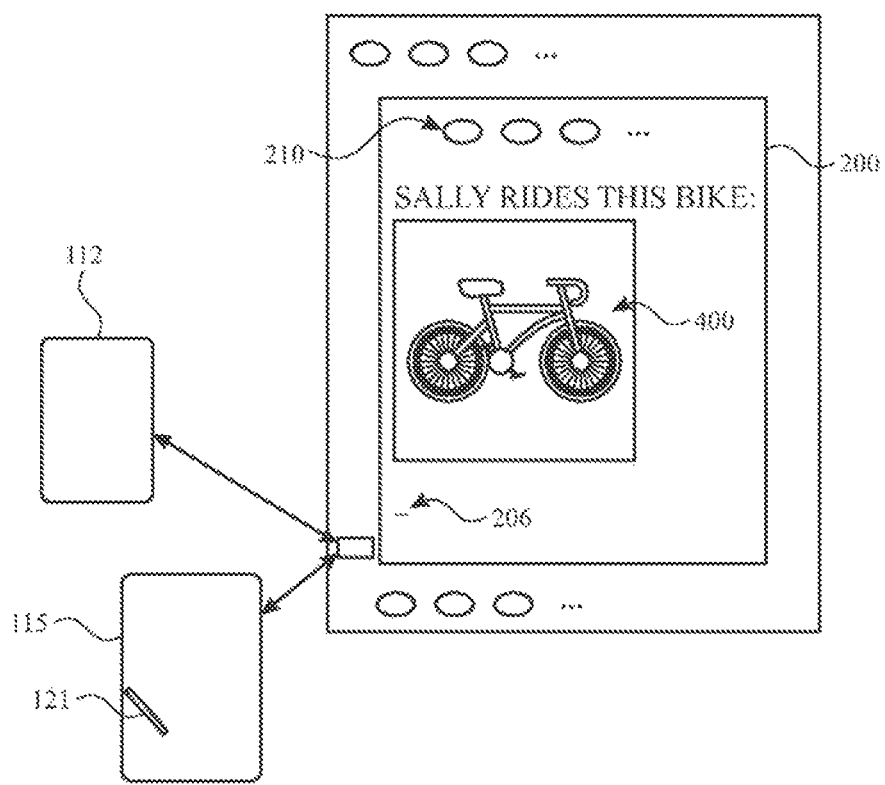
FIG. 4 illustrates a schematic diagram showing an exemplary user interface view for a content-editor application after insertion of remote input from a remote device into a content-editor application in accordance with one or more implementations.

An application such as a content-editor application, a file manager application, or other applications running on electronic device 110, 111, 112, or 115 can obtain the available-device list using the API of that device, and determine which remote devices in the list provided by the API can be used by the application to provide various types of input to the application (e.g., based on the list of features for that device). The application can then provide selectable options to a user for accessing a device in the list (e.g., by listing the available devices and/or by listing the available input types, for selection). An example of inserting input from a remote device, particularly in the illustrative scenario of inserting content generated at a remote device directly into a content-editor application of a primary device is illustrated in FIGS. 2, 3, and 4. However, it should be appreciated that the example of FIGS. 2-4, in which content is input to a content-editor application, is merely illustrative and, in other scenarios, the operations described in connection with FIGS. 2-4 can be used to directly input other data such as metadata such as image annotation data, AR data, sensor data, or the like to another application such as a file manager application and/or any other application that provides a user interface view.

FIG. 2 illustrates various states of electronic devices 110, 112, and 115 during operation of a content-editor application on electronic device 110. As shown in FIG. 2, communications circuitry of electronic device 110 (e.g., using API 208) communicates with remote electronic devices 112 and 115 to identify these devices as available devices that are trusted and/or communicatively coupled to electronic device 110, and to identify features of each device, such as a front-facing camera, a rear-facing camera, a touchscreen, a microphone, a keyboard, one or more sensors such as a health sensor (e.g., a heart-rate sensor), a motion sensor (e.g., an accelerometer, a gyroscope, a compass), etc. (not explicitly shown in FIG. 2)).

When code for an application such as a content-editor application is executed by the processor of electronic device 110, electronic device 110 displays a user-interface (UI) view 200, implemented in this example as a content-editor view into which content can be input and/or other data can be input to modify the UI view. In the example of FIG. 2, a user has entered alphanumeric text 204 (e.g., "Sally rides this bike.") using a keyboard, touchscreen, or audio input mechanism of the device, and a cursor 206 is provided within the UI view 200 to indicate the location of the next content to be input. UI view 200 in the example of FIG. 2 is a representation of a document in a word processing application. However, the content-editor view may be a representation of a presentation slide deck, an email, a note, a media content display, an image display, a video display or any other container for user content for a word processor, a presentation editor, an email editor, a messaging application, a spreadsheet, a media editor such as an image editor or a video editor (as examples).

In this example, the user desires to capture and input an image of Sally's bicycle for insertion into UI view 200. As shown, the UI view 200 includes selectable options 210, which include an input or insert option that, when selected, cause the content editor application to provide a list of selectable insert options 220. As shown in FIG. 2, electronic device 110 also include system control options 212 that can be selected for controlling aspects of electronic device 110 other than the content-editor application. For example, when one of options 210 is selected by a user of electronic device 110, the content-editor application may obtain, via API 208, list 225 of available devices including available features 226 for those devices. The content-editor application may receive list 225 and, based on the available features 226, identify types of input (e.g., image input, image markup input, drawing input, handwriting recognition input, sensor input, health data input, activity data input, AR data input, mood input, or the like) that can be provided by the available features 226.

In the example of FIG. 2, a list of selectable insert options 220 (e.g., displayed responsive to a selection of an insert option) includes an option 222 to input drawing input such as a freehand sketch input and/or handwritten letters, numbers, or characters (e.g., input as handwriting or digital representations of characters recognized in the handwriting) with a remote device (e.g., using a drawing input application and/or a handwriting recognition application on the remote device that utilizes a touchscreen or touchpad and/or a stylus input device) and an option 224 to capture an image with a remote device.

It should also be appreciated that, although not explicitly shown in FIG. 2, insert options 220 for other types of content or data that can be obtained and provided from a remote device can also be provided. For example, insert options 220 may include options for inputting health data (e.g., from a smart watch) such as heartrate data or activity data (e.g., a heart rate value, a heart rate graph, other electro-cardio data, steps data, calorie burning data, or an audio or video file indicative of heart activity of the user) motion data (e.g., from a motion sensor such as gyroscope, global positioning system (GPS) component, or accelerometer of a smart watch, smart phone, or tablet device), animojis or other animated content, augmented reality content or data (e.g., Augmented Reality video streams and/or associated meta data), and/or mood data (e.g., data for use in setting the theme of the content-editor application, another application, or other features of electronic device 110 as determined by a smart watch using biometric data captured by the smart watch, by a camera application with facial analysis capabilities that can identify facial point mapping data and/or generate mood indicating information from the facial point mapping data, or as determined at electronic device 110 using the biometric data, facial analysis data, or other data such as sensor data from the other device).

In the example of FIG. 2, the content-editor application has generated options 222 and 224 based on a list 225 of available devices (e.g., device "A", "B", and "C" that are communicatively coupled to electronic device 110) and corresponding data-generating features 226 for each device in the list, as obtained via API 208. In this example, device "A" may be electronic device 112 having a camera, a touchscreen, and a microphone, device "B" may be electronic device 115 having a camera, a touchscreen, a microphone, and a stylus input device 121, and device "C" may be a remote device registered at server 120 to a common user account with electronic device 110 and connected to network 106 (e.g., a smartwatch having a touchscreen and a microphone). In the configuration of FIG. 2, electronic devices 112 and 115 are in an inactive (e.g., low power) state.

Electronic device 110 may obtain, at the content-editor application in this example, list 225 of communicatively coupled devices and indications of one or more data-generating features 226 for each of the communicatively coupled devices. Electronic device 110 may then provide, for display with the content-editor application, a list of remotely obtainable content types (e.g., drawing content, image content, health data such as steps data, heart rate data, electro-cardio data, calorie data, blood pressure data or other data from a wearable device and/or other workout equipment, image editing metadata, augmented reality (AR) data such as data representing a user and/or the surroundings of a device and/or virtual content to be overlaid on or otherwise combined with one or more images of a user and/or the surroundings, and/or sensor data such as light sensor data, proximity sensor data, motion sensor data, or the like).

In the example of FIG. 2, because all of devices "A", "B", and "C" have touch screens, content-editor application provides a drawing input option 222 linked to each of devices "A", "B", and "C". In one example, because device "B" includes stylus input device, content-editor application may identify device "B" as the device best suited for drawing input and may set device "B" as a default drawing input device with devices "A" and "C" as alternate options. In another example, devices "A", "B", and "C" may be provided as unranked options for drawing input for user selection.

In the example of FIG. 2, because devices "A" and "B" have cameras, content-editor application provides an image capture input option 224 linked to each of devices "A" and "B". Electronic device 110 may receive, with the content-editor application, a selection of one of the remotely obtainable content types such as a selection of image capture input option 224.

FIG. 3 shows an example of electronic devices 110, 112, and 115 in an operational scenario in which image capture input option 224 is selected. As shown in FIG. 3, responsive to the selection of image capture input option 224 at electronic device 110, electronic device 110 identifies, with the content-editor application, a second electronic device (electronic device 112 or device "A") and a third electronic device (electronic device 115 or device "B") as available devices for providing an image. Electronic device 110 then activates the camera of electronic device 112 and the camera of electronic device 115, with the content-editor application of electronic device 110, responsive to the selection of option 224.

As shown in FIG. 3, activating the cameras of electronic devices 112 and 115 from the content editor application of electronic device 110 activates a camera application on electronic device 112 and a camera option on electronic device 115 such that electronic device 112 displays an image preview 300 and an image capture option 302, and electronic device 115 displays an image preview 304 and an image capture option 306. In this configuration, content-editor application (e.g., via API 208) has activated camera applications of both of electronic devices 112 and 115 so that the user can select one of these devices for capturing the image. In the example of FIG. 3, a placeholder 307 indicating the location of the image to be inserted may be displayed in the UI view 200.

The camera application (or another remote input application such as a drawing input application, sensor input application, etc.) can be activated outside of a lock screen (e.g., without requiring user authentication at that device for use of the camera or other application) of each device so that the user can operate the device to generate and insert the input without providing access to potentially sensitive user content stored on the device. In some implementations, an application running on electronic device 110 may be provided with the ability to bypass a security mechanism on the secondary device (e.g., electronic device 111, 112, or 115), such as a lock screen or passcode/password, when another application and/or a component of secondary device is activated for input. For example, in one or more implementations secondary devices that have been identified as available devices to the application on electronic device 110 and for which a user account associated with the secondary device and/or logged into the secondary device is the same as the user account associated with the primary device and/or logged into the primary device, bypassing the security mechanism for the secondary device may be allowed.

It should also be noted that the camera application (or another remote input application such as a handwriting input application) can be used to insert content into the content-editor application on electronic device 110 without activating or operating a content-editor application (e.g., the same word processor application or the same email client) on electronic device 112 or electronic device 115.

In the example of FIG. 3, the content-editor application at electronic device 110 receives an indication that electronic device 112 has been selected for generating and inserting the desired image. Accordingly, the content-editor application at electronic device 110 deactivates the camera and camera application on electronic device 115. The indication to the content-editor application at electronic device 110 may be the act of capturing the image with electronic device 112 by selection of image capture option 302 in an image capture operation in one or more implementations. However, in the example of FIG. 3, electronic device 112 has been moved (e.g., picked up by the user) and that motion has been detected by electronic device 112 (e.g., by the inertial measurement unit or accelerometer of electronic device 112), and has caused electronic device 112 to generate an indication for electronic device 110 that electronic device 112 has been selected by the user.

In the example of FIG. 3, the content-editor application of electronic device 110 provides, for display (e.g., in UI view 200 of electronic device 110), a preview image stream 308 from the camera of selected electronic device 112 that mirrors the image preview 300 displayed at selected electronic device 112. However, it should be appreciated that UI view 200 can be provided without placeholder 307 or preview image stream 308 in some implementations. It should also be appreciated that preview image stream 308 can be provided to mirror any data stream or content being generated by a selected remote device such as a real-time display of handwriting input being generated at the remote device. It should also be appreciated that placeholder 307 can include image preview streams from all activated devices (e.g., side-by-side streams from both of electronic devices 112 and 115) so that the preview streams in placeholder 307 can be used for selection of the desired device (e.g., if the two devices are being operated by other users remote from the location of electronic device 110 or if the two devices provide different viewing angles on a common object to be imaged).

A first communication protocol, such as Bluetooth, may be used to discover the devices and features in list 225 and/or to activate one or more components of the discovered devices. In various implementations, the first communications protocol and/or a second communications protocol, such as WiFi, other local area network (LAN) or other network or wired/wireless communications protocol and/or circuitry, may be used to communicate the preview image stream, content, etc. Preview image stream 308 may include piecewise or continuously provided data from the remote device (e.g., a full-resolution data stream representing stylus input may be provided from the remote device as it is received from the remote device, or a lower-resolution preview data stream may be provided in which, for example, pieces of a drawing stroke input with a stylus at the remote device are periodically provided). A preview image stream 308 from the camera of selected electronic device 112 may be a full-resolution image stream or may be a reduced-resolution image stream to facilitate faster transfer and progress to electronic device 110. In some examples, preview image stream 308 may be an augmented reality (AR) video stream including video frames and overlaid content for one or more of the video frames.

In the example of FIGS. 2-4, when the bicycle for which an image is desired is within the view of the camera of electronic device 112, the user may select image capture option 302 (or a corresponding option on electronic device 110) to capture an image 400 of the bicycle with the camera of electronic device 112. By the selection of the image capture option, the image 400 is captured, transmitted, and directly inserted into UI view 200 at the location of cursor 206, which is moved accordingly to an updated next input location. As shown in FIG. 4, when image 400 is inserted, electronic device 112 is deactivated (e.g., without storing image 400 at electronic device 112).

In one or more implementations, commands for operating the camera of electronic device 112 (or another component of another device for an image capture or other remote input operation) can be generated by the content-editor application of electronic device 110 and transmitted to the remote device by communications circuitry of electronic device 110 (e.g., by API and/or network interfaces 1016). In these configurations, the content-editor application of electronic device 110 stores information associated with camera components of various types of electronic devices for generation of the camera-control commands.

In one or more implementations, commands for operating the camera of electronic device 112 (or another component of another device for an image capture or other remote input operation) can be generated by API 208. In these configurations, API 208 of electronic device 110 is used to store information associated with camera components of various types of electronic devices for generation of the camera-control commands responsive to a device-independent image request by the content-editor application via API 208.

Figure 5:
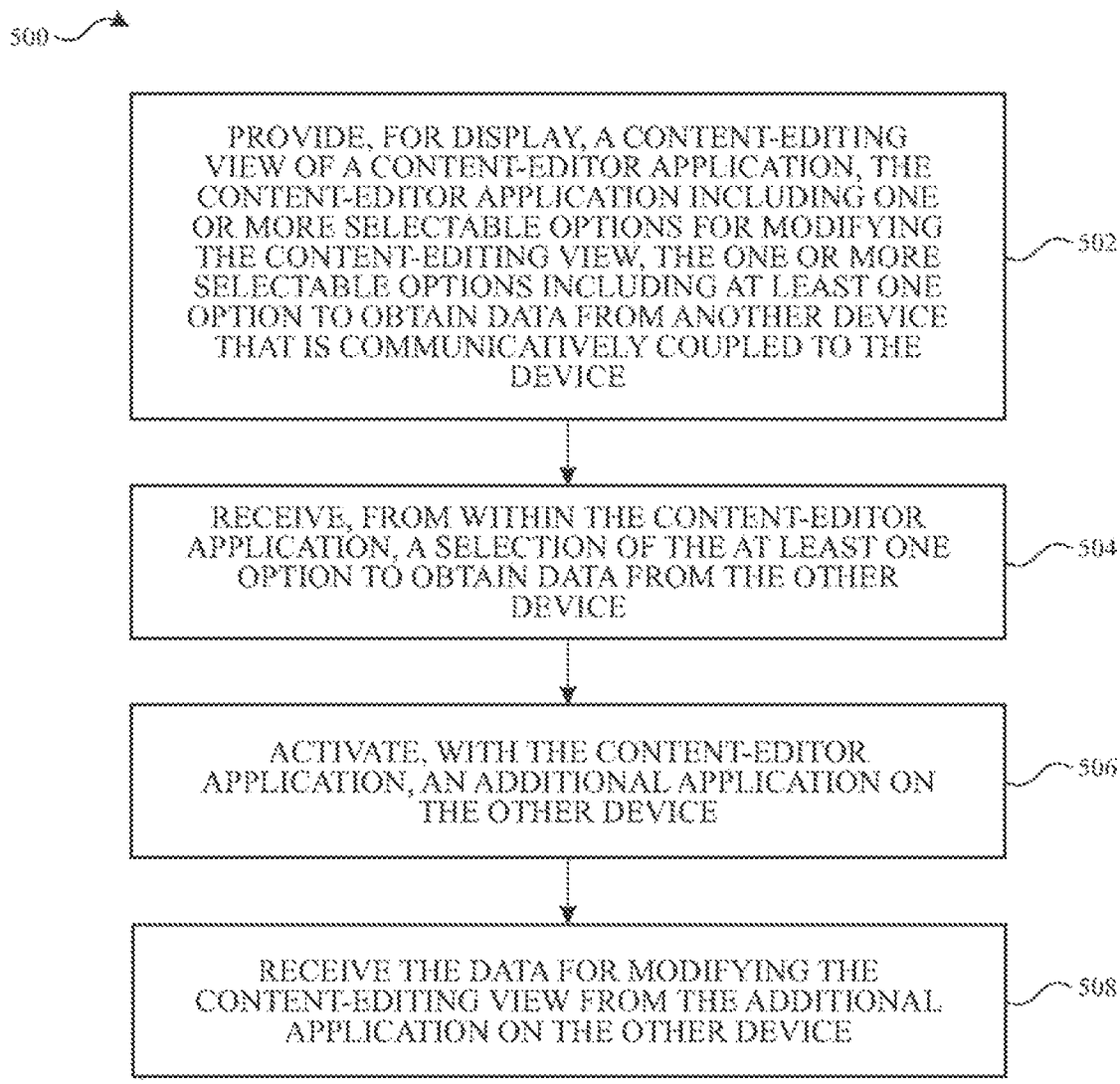
FIG. 5 illustrates a flow diagram of an example process for obtaining input for a content-editor application from a remote device in accordance with one or more implementations.
Figure 6:
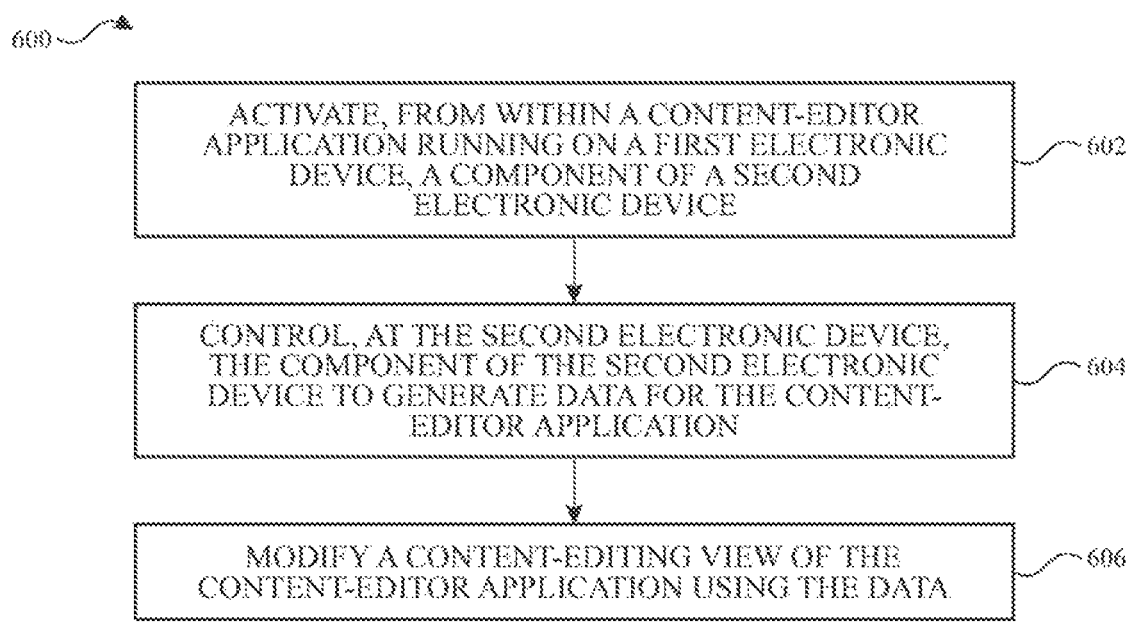
FIG. 6 illustrates a flow diagram of another example process for obtaining input for a content-editor application from a remote device in accordance with one or more implementations.
Figure 7:
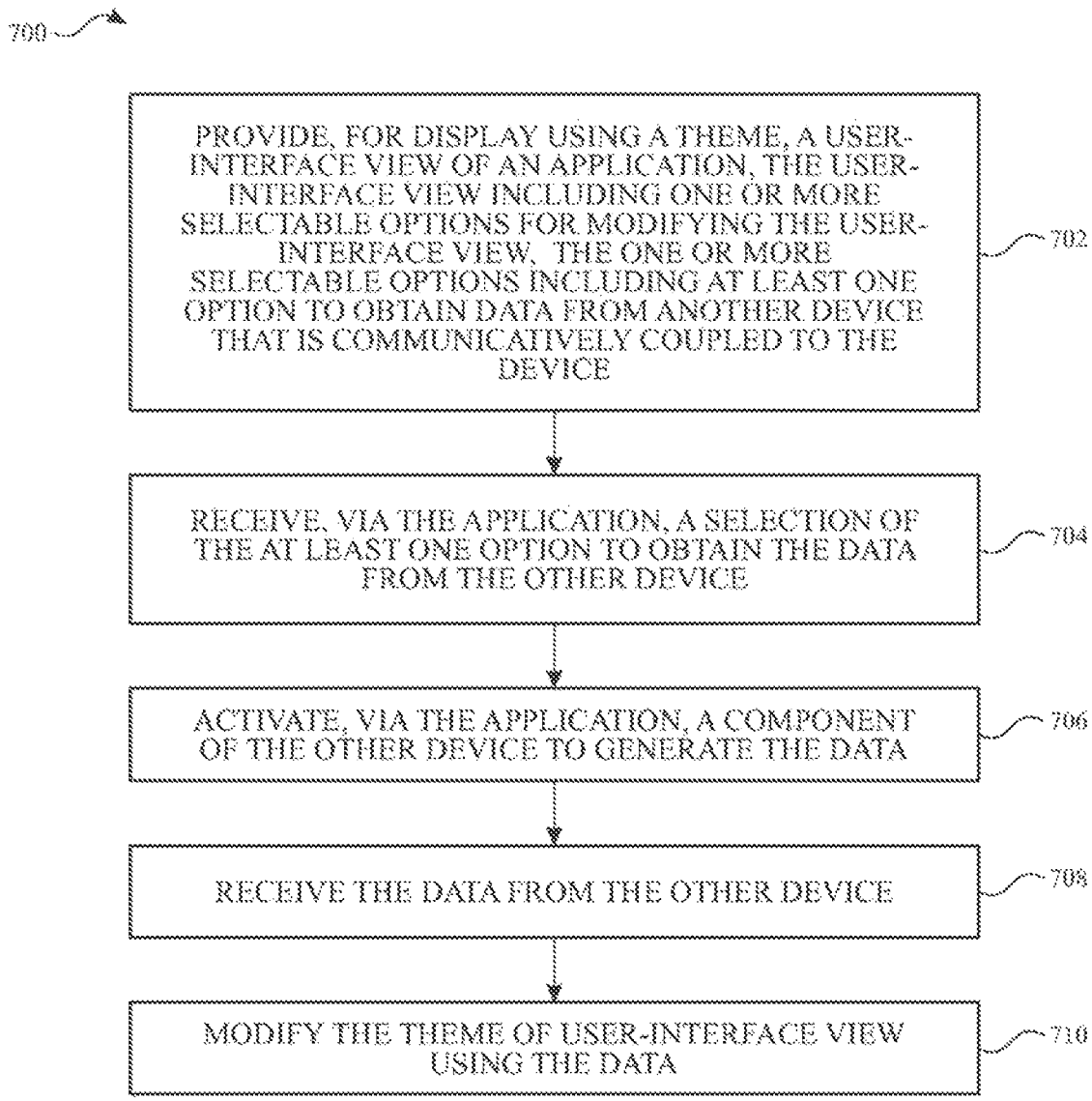
FIG. 7 illustrates a flow diagram of an example process for obtaining data for an application from a remote device in accordance with one or more implementations.
Figure 8:
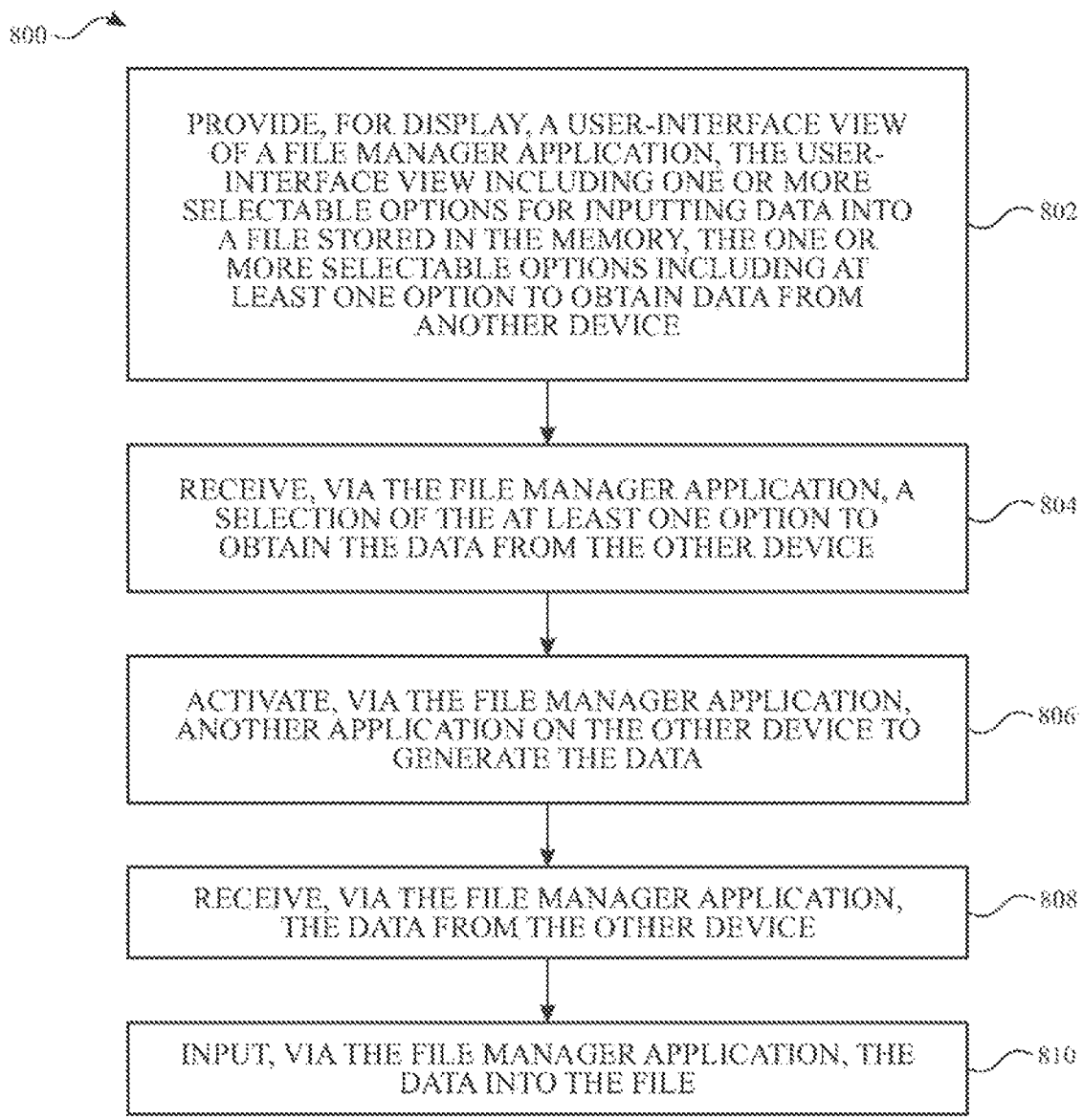
FIG. 8 illustrates a flow diagram of an example process for obtaining data for a file manager application from a remote device in accordance with one or more implementations.

In the examples of FIGS. 2-4, image capture input option 224 is selected for input of an image into a document provided by a content-editor application. However, it should also be appreciated that direct input from another device can be provided to any application for input of content, modification of a UI view, and/or direct input of data or content into a file or file folder. FIGS. 5 and 6 describe examples of providing data such as content for direct input into a content-editing view of a content-editor application. FIG. 7 shows another example in which a UI view of an application is provided with a theme and data such as mood data from another device is used to modify the theme. FIG. 8 shows another example in which a file manager application is provided with data from a remote device for direct input into a filesystem file or filesystem folder, via the file manager application.

However, it should be appreciated that these examples are illustrative and other examples of input from another device are contemplated. For example, a user of a first device may request use of a remote device to edit or markup an image using an image editing application on another device (e.g., a device having a touchscreen and/or stylus for use in editing or marking up the image). In this example, a file manager application or an image editor application on the first device may provide, responsive to the request, the image to the remote device and activate the image editor application on the remote device for editing of the image. The remote device may receive markup input (e.g., via a stylus and/or touchscreen) and provide markup metadata (e.g., during or after receiving the markup input), based on the received markup, to the first device for rendering of the received markup on the image at the first device (e.g., without storing the image or the markup metadata at the remote device and, in some scenarios, without sending the image back to the first device).

FIG. 5 illustrates a flow diagram of an example process 500 for directly receiving data (e.g., inserting content) from another device such as a remote device into a content-editor application in accordance with one or more implementations. For explanatory purposes, the process 500 is primarily described herein with reference to components of the components of FIGS. 1 and 2 (particularly with reference to electronic devices 110, 111, 112, and 115), which may be executed by one or more processors of the electronic devices 110, 111, 112, and 115 of FIGS. 1-4. However, the process 500 is not limited to the electronic devices 110, 111, 112, and 115, and one or more blocks (or operations) of the process 500 may be performed by one or mote other components of other suitable devices, such as one or more other electronic devices such as a smartwatch or digital camera. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, the processor of electronic device 110 provides, for display, a content-editor view 200 of a content-editor application, the content-editor application including one or more selectable options 210 for obtaining data (e.g., an image, a video, augmented reality content, image markup metadata, handwriting recognition data, freehand sketch data, steps data, heart rate data, electro-cardio data, calorie data, blood pressure data, and/or mood data) from mother device such as for insertion of content into the content-editing view. The one or more selectable options 210 include at least one option (see, e.g., drawing input option 222 and image capture input option 224 of FIG. 2) to obtain input such as content from another device such as a remote device (e.g., electronic device 111, electronic device 112 or electronic device 115) that is communicatively coupled to the electronic device 110, and/or is paired with the electronic device 110. Electronic devices such as electronic device 110, electronic device 111, electronic device 112, and/or electronic device 115 may use a pairing process to establish a trust relationship and then later connect to one another, i.e. a paired device may not be communicatively coupled to another device at all times, but can quickly become communicatively coupled.

The processor of electronic device 110 may also discover the other device, identify one or more available features of the other device (e.g., based on the presence of various components of the other device and/or available software control of the various components), and identify one or more types of input that are obtainable using the one or more available features, at least one of the one or more types of input corresponding to the data. Identifying the available features of the other device may include obtaining, based on communications with the other device (e.g., including received signals, broadcast from the other device, including feature flags for the other device), a list of available services in software at the remote device. The available services in software at the remote device may include services for remote use of a hardware component (e.g., a camera, a touch screen, a stylus, a light sensor, a motion sensor, an activity sensor, or a location sensor) and/or software service at the remote device. For example, the other device may advertise available services based on whether hardware support (e.g., for remote use of a hardware component) is available on the other device, whether new services provided in a newer version of system software for the other device have been installed at the other device, and/or whether a particular service has been enabled or disabled (e.g., based on a user settings). The processor may also generate the one or more selectable options based on the one or more types of input.

The electronic device 110 may also include one or more available components (e.g., a camera, a touch screen, a stylus, a light sensor, a motion sensor, an activity sensor, or a location sensor) that are available for use (e.g., components that have associated available services in software such as hardware support for remote use of the component, and/or that are enabled for remote use such as by a user setting) by the other device and/or additional devices (e.g., others of electronic device 111, electronic device 112 or electronic device 115). The electronic device 110 may also advertise a feature flag for use of the available component for providing data to the other device. Advertising the feature flag may include broadcasting a signal that includes the feature flag for discovery by the other devices.

At block 504, the processor of electronic device 110 receives, from within the content-editor application, a selection of the at least one of the selectable insert options 220 to obtain data such as content from the other device.

At block 506, the processor of electronic device 110 activates, with the content-editor application, an additional application on the other device. The additional application may be unrelated to the device or to the content-editor application. For example, the additional application may be a camera application associated with a camera of a remote device, a health-monitoring or activity-monitoring application of a smart watch, a handwriting recognition application, an image markup application, an activity monitoring application associated with a sensor of the other device, a health monitoring application associated with the sensor of the other device, or a drawing entry (e.g., a note-taking or freehand sketch) application associated with a stylus of a remote device. More generally, the additional application may be different from the content-editor application running on the electronic device 110 and may be configured for operation of a component of the other device and independent of any components of electronic device 110.

At block 508, the processor of electronic device 110 receives data for the content-editing view (e.g., content such as image 400 for insertion into the content-editor application), with the content-editor application from the additional application on the other device. In one or more implementations, receiving the data may include generating commands, with the content-editor application, for operating a component of the remote device to generate content for insertion, and providing the generated commands to remote device with communications circuitry (see, e.g., API 208 of FIG. 2 and/or network interfaces 1016 of FIG. 10) of the device. In one or more implementations, receiving the data may include calling, from the content-editor application of the device and via an application programming interface 208 of the device, a function for requesting content, and providing, via the application programming interface 208 and responsive to the calling function, commands for operating a component of the other device to generate the content for insertion.

FIG. 6 illustrates a flow diagram of another example process 600 for directly receiving a data stream (e.g., for inserting content or other direct input of data) from another device such as a remote device into a content-editor application in accordance with one or more implementations. For explanatory purposes, the process 600 is primarily described herein with reference to components of the components of FIGS. 1 and 2 (particularly with reference to electronic devices 110, 111, 112, and 115), which may be executed by one or more processors of the electronic devices 110, 111, 112, and 115 of FIGS. 1 and 2. However, the process 600 is not limited to the electronic devices 110, 111, 112, and 115, and one or more blocks (or operations) of the process 600 may be performed by one or more other components of other suitable devices, such as a smart watch or a digital camera. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, the processor of a first electronic device (e.g., electronic device 110) activates, from within a content-editor application running on the first electronic device, a component of a second electronic device (e.g., electronic device 112 or electronic device 115). In one example, the content-editor application is a word processing application displaying a content-editor view 200 that includes a document for editing, and the inserting includes displaying the captured image 400 in the displayed document without storing the captured image at the second electronic device.

At block 604, the processor of the second electronic device controls, at the second electronic device, the component of the second electronic device to generate a data stream for the content-editor application (e.g., to insert as content or to generate content for insertion into the content editor application). Controlling the component of the second electronic device may include operating a camera of electronic device 112 or electronic device 115 to capture an image 400 or generate image metadata such as mood data based on one or more captured images (e.g., responsive to selection of an image capture option 302/306 at the second electronic device).

At block 606, the processor of the second electronic device receives an input (e.g., a selection of an image capture option or a send option from a drawing input application) and modifies a content-editing view of the content-editor application (e.g., by inserting content generated at the second electronic device into the content editor application). For example, modifying the content-editing view may include inserting generated content into the content-editor application by transmitting the captured image 400 from the second electronic device into the content-editor application of the first electronic device responsive to the selection of the image capture option 302 at the second electronic device and without further input to the second electronic device or the first electronic device.

The first electronic device may also receive, with the content-editor application from the second electronic device, an indication that the second electronic device has been selected for obtaining the one of the remotely obtainable content types. The first electronic device may deactivate, responsive to the indication, the component of a third electronic device. The indication that the second electronic device has been selected may include an indication of motion of the second electronic device, an indication of an image capture operation on the second electronic device, an indication of motion of a stylus associated with the second electronic device, or a touch input to a touchscreen of the second electronic device (as examples).

The second electronic device, in some examples, may receive an image from the first electronic device (e.g., an image stored in the memory of the first electronic device or an image captured with a camera of the first electronic device). The second electronic device may display the image, and receive image markup input via a touchscreen of the second electronic device. The second electronic device may provide image markup metadata based on the image markup input to the first electronic device, without storing the image or the image markup metadata, and without sending the image to the first electronic device. The first electronic device may render the image markup input on the displayed image at the first electronic device, using the image markup metadata.

FIG. 7 illustrates a flow diagram of an example process 700 for directly receiving data from another device for modifying a user-interface view of an application in accordance with one or more implementations. For explanatory purposes, the process 700 is primarily described herein with reference to components of the components of FIGS. 1 and 2 (particularly with reference to electronic devices 110, 111, 112, and 115), which may be executed by one or more processors of the electronic devices 110, 131, 112, and 115 of FIG. 1. However, the process 700 is not limited to the electronic devices 110, 111, 112, and 115, and one or more blocks (or operations) of the process 700 may be performed by one or more other components of other suitable devices, such as one or more other electronic devices such as a smartwatch or digital camera. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, the processor of electronic device 110 provides, for display using a theme, a user-interface view of an application, the user-interface view including one or more selectable options 210 for obtaining data from another device such as for modification of the user-interface view (e.g., via insertion of content into the UI view or modification of displayed portions of the view). The one or more selectable options 210 include at least one option to obtain data such as mood data from another device such as a remote device (e.g., electronic device 111, electronic device 112 or electronic device 115) that is communicatively coupled to the electronic device 110, and/or is paired with the electronic device 110. Electronic devices such as electronic device 110, electronic device 111, electronic device 112, and/or electronic device 115 may use a pairing process to establish a trust relationship and then later connect to one another, i.e. a paired device may not be communicatively coupled to another device at all times, but can quickly become communicatively coupled.

At block 704, the processor of electronic device 110 receives, via the application, a selection of the at least one of the selectable insert options 220 to obtain the data from the other device.

At block 706, the processor of electronic device 110 activates, via the application, an additional application on the other device. The additional application on the other device may be unrelated to the electronic device 110 or to the application running on electronic device 110. For example, the additional application may be a camera application associated with a camera of a remote device, a health-monitoring, mood-monitoring, or activity-monitoring application of a smart watch, or a drawing entry (e.g., a note-taking or freehand sketch) application associated with a stylus of a remote device. More generally the additional application on the other device may be different from the application running on the electronic device 110 and may be configured for operation of a component of the ether device and independent of any components of electronic device 110.

At block 708, the processor of electronic device 110 receives the data for the UI view (e.g., data such as mood data for modifying the theme of the UI view), with the application, from the additional application on the other device. In one or more implementations, receiving the data may include generating commands, with the application, for operating a component of the other device to generate the data, and providing the generated commands to other device with communications circuitry (see, e.g., API 208 of FIG. 2 and/or network interfaces 1016 of FIG. 10) of the device.

In one or more implementations, receiving the data may include calling, from the application of the device and via an application programming interface 208 of the device, a function for requesting data, and providing, via the application programming interface 208 and responsive to the calling function, commands for operating a component of the other device to generate the data. In one example, the at least one option to obtain the data from the other device includes an option to obtain mood data using a camera or a sensor of the other device. In one example, the data includes the mood data, the mood data being indicative of a mood (e.g., a happy mood, a sad mood, an angry mood, an excited mood, an afraid mood, a silly mood, a wild mood, or the like) of a user of the other device. As described herein, the mood of the user may be determined, using a camera of the other device (e.g., and associated software and/or circuitry for identifying facial features and expressions) and/or one or more health or activity sensors (e.g., optical light sensors, infrared sensors, other light sensors, heartrate sensors, motion sensors, etc.).

At block 710, the application may modify the theme of the UI view using the data. For example, modifying the theme may include changing a background color or background image of the UI view, changing a color scheme or color palate used for various features of the UI view, changing the shape of virtual buttons, or other displayed features, and/or replacing, adding, or removing displayed features of the UI view, based on the determined mood of the user. The mood may be determined by and provided by the remote device or the mood can be determined by the application based on mood data or sensor data provided from the remote device.

FIG. 8 illustrates a flow diagram of an example process 800 for directly receiving data from another device for input to a file with a file manager application in accordance with one or more implementations. For explanatory purposes, the process 800 is primarily described herein with reference to components of the components of FIGS. 1 and 2 (particularly with reference to electronic devices 110, 111, 112, and 115), which may be executed by one or more processors of the electronic devices 110, 111, 112, and 115 of FIG. 1. However, the process 800 is not limited to the electronic devices 110, 111, 112, and 115, and one or more blocks (or operations) of the process 800 may be performed by one or more other components of other suitable devices, such as one or more other electronic devices such as a smartwatch or digital camera. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, the processor of electronic device 110 provides, for display using a theme, a user-interface view of a file manager application, the user-interface view including one or more selectable options 210 for inputting data into a file stored by the memory of the device. The UI view of the file manager application may include a search field for entry of search queries for searching the filesystem of the electronic device and a file view in which lists or icons representing files and/or folders on the file system are displayed. The one or more selectable options 210 include at least one option to obtain data from another device such as a remote device (e.g., electronic device 111, electronic device 112 or electronic device 115) that is communicatively coupled to the electronic device 110, and/or is paired with the electronic device 110. Electronic devices such as electronic device 110, electronic device 111, electronic device 112, and/or electronic device 115 may use a pairing process to establish a trust relationship and then later connect to one another, i.e. a paired device may not be communicatively coupled to another device at all times, but can quickly become communicatively coupled.

At block 804, the processor of electronic device 110 receives, via the file manager application, a selection of the at least one of the selectable insert options 220 to obtain the data from the other device.

At block 806, the processor of electronic device 110 activates, via the file manager application, another application on the other device. The other application on the other device may be unrelated to the electronic device 110 or to the file manager application running on electronic device 110. For example, the other application may be a camera application associated with a camera of a remote device, a health-monitoring, mood-monitoring, or activity-monitoring application of a smart watch, or a drawing entry (e.g., a note-taking or freehand sketch) application associated with a stylus of a remote device. More generally, the other application on the other device may be different from the file manager application running on the electronic device 110 and may be configured for operation of a component of the other device and independent of any components of electronic device 110.

At block 808, the processor of electronic device 110 receives the data for the UI view, with the file manager application, from the other application on the other device. In one or more implementations, receiving the data may include generating commands, with the file manager application, for operating a component of the other device to generate the data, and providing the generated commands to other device with communications circuitry (see, e.g., API 208 of FIG. 2 and/or network interfaces 1016 of FIG. 10) of the device. In one or more implementations, receiving the data may include calling, from the file manager application of the device and via an application programming interface 208 of the device, a function for requesting data, and providing, via the application programming interface 208 and responsive to the calling function, commands for operating a component of the other device to generate the data.

At block 810, the file manager application may input the received data into a file on the filesystem. Inputting the received data into the file may include saving the data as a file in a file folder, opening the file and inserting the data into the file without further user input, or inserting the data into the file without opening the file (e.g., by opening a background version of the file without displaying the opened background version, inserting the data, and saving the file with the inserted data and/or by generating a new file from the data). The other device may provide the data for the file to the file manager without storing the data on the other device.

Figure 9:
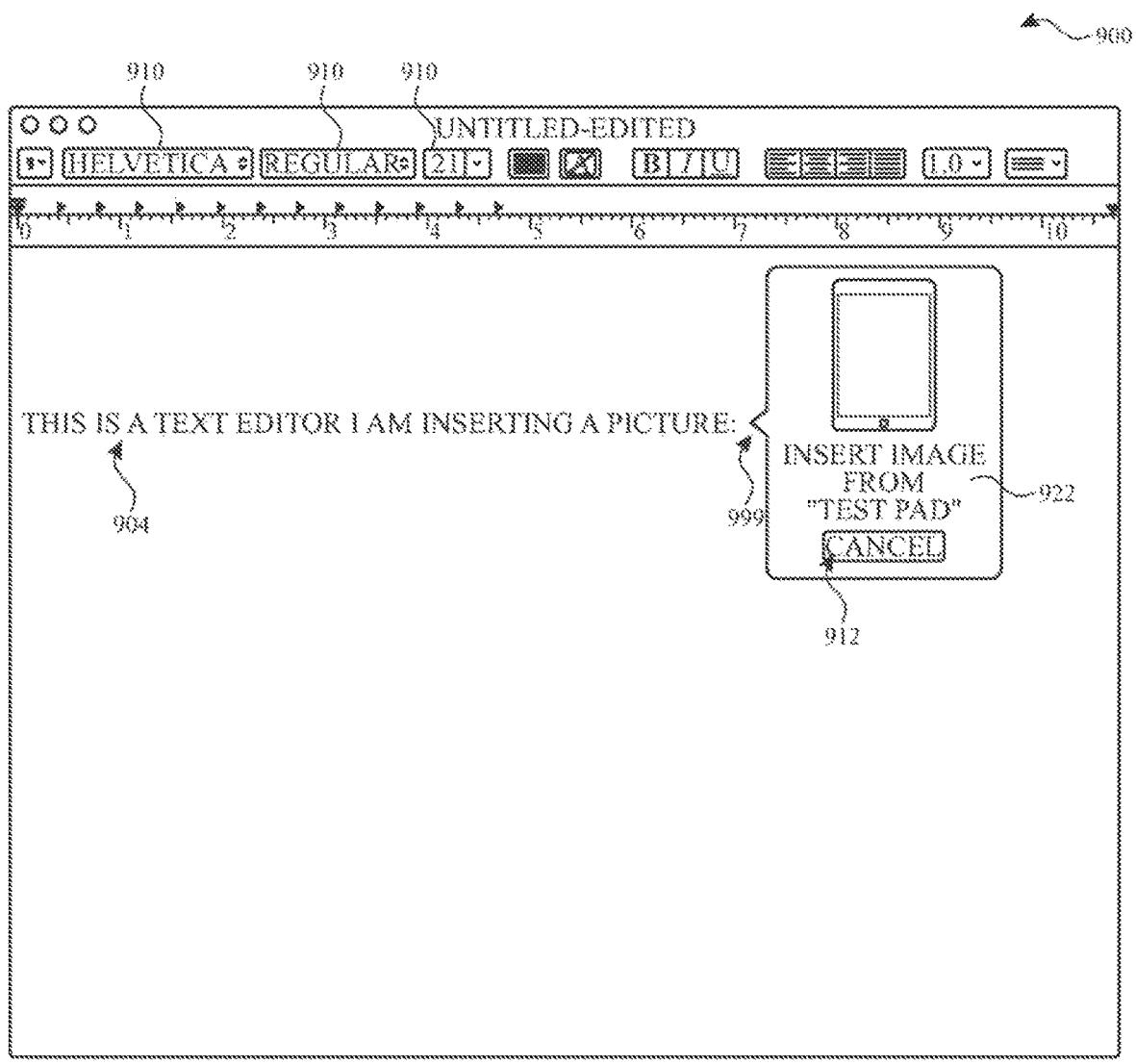
FIG. 9 illustrates a schematic diagram showing another exemplary user interface view for an application with remote input options in accordance with one or more implementations.

FIG. 9 illustrates a user-interface (UI) view 900 for an application, implemented in this example as a content-editor view or text editor view into which content can be input and/or other data can be input to modify the UI view. In the example of FIG. 9, a user has entered alphanumeric text 904 (e.g., "This is a text editor I am inserting a picture") using a keyboard, touchscreen, or audio input mechanism of the device UI view 900 in the example of FIG. 9 is a representation of a document in a text editor application.

In this example, the user desires to capture and input a picture into UI view 900. As shown, the UI view 900 includes selectable options 910, which may (although not explicitly shown) include an input or insert option that, when selected, cause the application to provide an option 922 to capture an image with a remote device such as a tablet device (e.g., identified in FIG. 9 as "Test pad"). In the example of FIG. 9, option 922 is provided as a pop-up window or callout box that includes a visual indicator 999 of the location at which a captured image will be inserted into the UI view 900. It should also be appreciated that option 922 to capture an image with "Test pad" may be also or alternatively be provided responsive to, for example, a right click at the location of the desired input, a voice command from a user, or automatically upon detection of user-entered text such as the term "inserting" and/or the term "picture". It should also be appreciated that, although a single input option 922 is shown in FIG. 9 (for inserting a picture from a single device), this is merely an example, and additional input options as described herein (e.g., drawing input, sensor input, health data input, or other desired input from "Test pad" and/or one or more input options with other devices) may be provided (e.g., in a list as described above in connection with list 220 of FIG. 2).

To capture and insert the picture using "Test pad", the user may click on a clickable location of option 922 (e.g., anywhere within the displayed area of option 922 or on the displayed icon representing "Test pad") to activate the camera of the tablet device "Test pad". To provide the user with the ability to dismiss the option 922, a cancel option 912 may also be provided with option 922 as shown.

As described above, one aspect of the present technology is the gathering and use of data available from specific and legitimate sources for insertion of content or other data from another device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify available remote devices, obtain access to the remote devices, and/or to rank or score the remote devices for relative suitability for insertion of content or other data from the remote device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices in particular, such entities would be expected to implement and consistently apply privacy practices that are generally recognized as meeting or exceeding industry or governmental requirements for maintaining the privacy of users. Such information regarding the use of personal data should be prominently and easily-accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy polices and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA), whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of insertion of content or other data from a remote device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, insertion of content or other data from a remote device can be performed based on non-personal information data or a bare minimum amount of personal information, such as the content being requested by the device associated with a user, other non-personal information available to the application obtaining the content or other data, or publicly available information.

Figure 10:
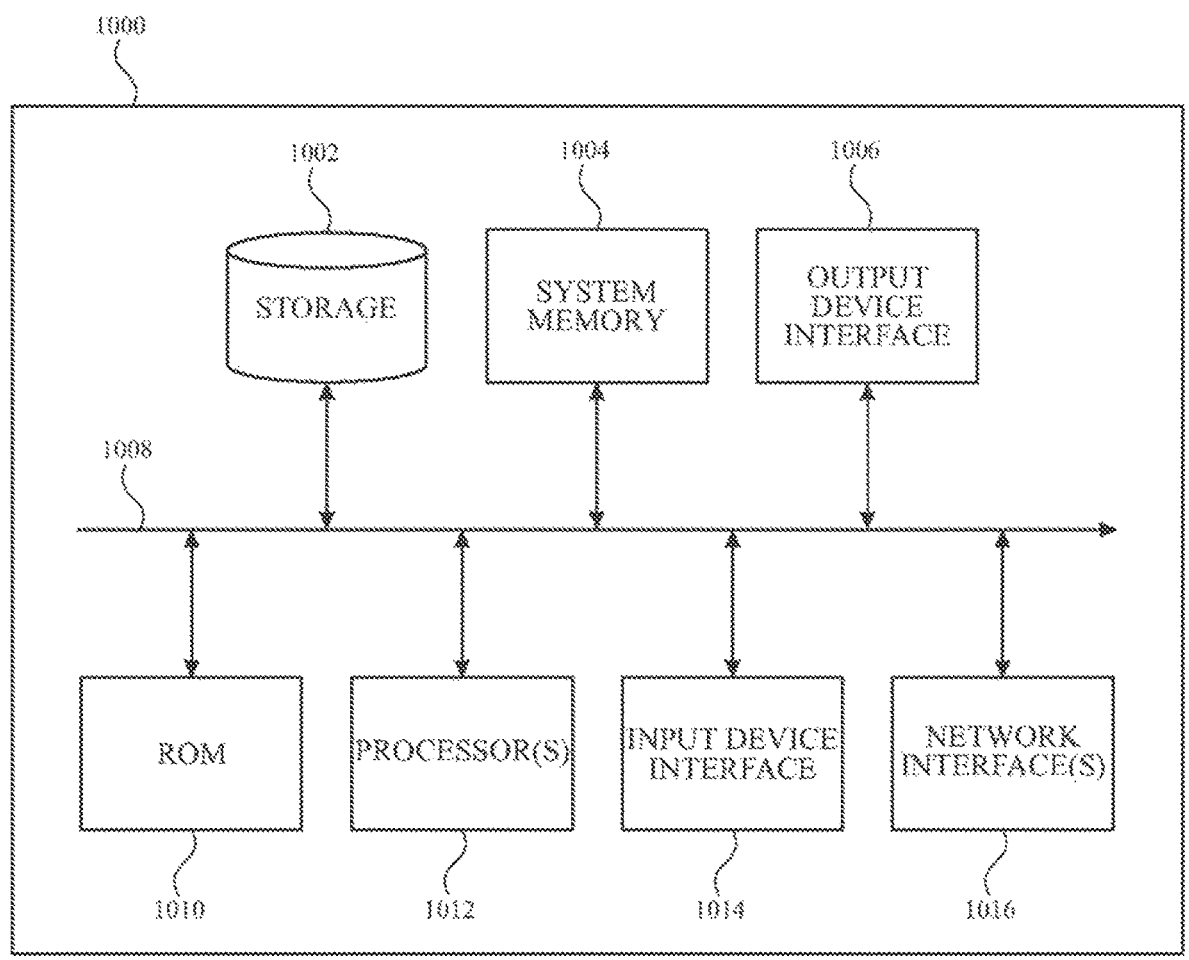
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, the electronic device 111, the electronic device 112, the electronic device 115, and/or the server 120 shown in FIG. 1. The electronic system 1000 may include various types of computer readable media and interfaces for various other types of computer readable media. The electronic system 1000 includes a bus 1008, one at more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such is random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 10, the bus 1008 also couples the electronic system 1000 to one or more networks and/or to one or more network nodes, such as the electronic device 113 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

In accordance with various aspects of the subject disclosure, a device is provided that includes a memory and at least one processor communicatively coupled to the memory and configured to provide, for display, a content-editing view of a content-editor application. The content-editing view includes one or more selectable options for modifying the content-editing view. The one or more selectable options include at least one option to obtain data from another device that is communicatively coupled to the device. The at least one processor is further configured to receive, via the content-editor application, a selection of the at least one option to obtain data from the other device. The at least one processor is further configured to activate, via the content-editor application, an additional application on the other device. The at least one processor is further configured to receive the data for modifying the content-editing view from the additional application on the other device.

In accordance with various aspects of the subject disclosure, a non-transitory computer-readable medium is provided that includes instructions, which when executed by at least one computing device, cause the at least one computing device to perform operations including providing, for display, a content-editing view of a content-editor application. The content-editing view includes one or more selectable options for insertion of content into the content-editing view. The one or more selectable options include at least one option to obtain content from a remote device. The operations further include receiving, from within the content-editor application, a selection of the at least one option to obtain content from the remote device. The operations further include activating, with the content-editor application, an additional application on the remote device. The operators further include receiving content for insertion into the content-editing view, with the content-editor application from the additional application on the remote device.

In accordance with various aspects of the subject disclosure, a system is provided that includes a first electronic device configured to activate, from within a content-editor application running on the first electronic device, a component of a second electronic device. The system further includes the second electronic device. The second electronic device is configured to control the component of the second electronic device to generate data for the content-editor application. The second electronic device is further configured to modify a content-editing view of the content-editor application of the first electronic device using the data.

In accordance with various aspects of the subject disclosure, a device is provided that includes a memory and at least one processor communicatively coupled to the memory. The at least one processor is configured to provide, for display using a theme, a user-interface view of an application. The user-interface view includes one or more selectable options for modifying the user-interface view. The one or more selectable options include at least one option to obtain data from another device that is communicatively coupled to the device. The at least one processor is further configured to receive, via the application, a selection of the at least one option to obtain the data from the other device. The at least one processor is further configured to activate, via the application, a component of the other device to generate the data. The at least one processor is further configured to receive the data from the other device. The at least one processor is further configured to modify the theme of user-interface view using the data.

In accordance with various aspects of the subject disclosure, a device is provided that includes a memory and at least one processor communicatively coupled to the memory. The at least one processor is configured to provide, for display, a user-interface view of a file manager application. The user-interface view includes one or more selectable options for inputting data into a file stored in the memory. The one or more selectable options include at least one option to obtain data from another device. The at least one processor is further configured to receive, via the file manager application, a selection of the at least one option to obtain the data from the other device. The at least one processor is further configured to activate, via the file manager application, another application on the other device to generate the data. The at least one processor is further configured to receive, via the file manager application, the data from the other device. The at least one processor is further configured to input, via the file manager application, the data into the file.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the an to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
a memory; and
at least one processor communicatively coupled to the memory and configured to:
identify one or more other devices that are separate from and communicatively coupled to the device, the one or more other devices comprising a portable computing device that stores a plurality of applications that can be run at the portable computing device;
identify one or more available features of each of the one or more other devices, including a plurality of available features of the portable computing device;
identify a plurality of input types including an image input type, that can be provided by the plurality of available features of the portable computing device;
provide, for display, a content-editing view of a content-editor application, the content-editing view including one or more selectable options for modifying the content-editing view, wherein the one or more selectable options include a plurality of selectable options that each correspond to one of the plurality of identified input types that can be provided by the plurality of available features of the portable computing device;
receive, via the content-editor application, a selection of one option of the plurality of selectable options to obtain data of the corresponding identified input type from the portable computing device;
activate, via the content-editor application, an application of the plurality of applications on the portable computing device, the application corresponding to the one option of the plurality of selectable options and to the corresponding identified input type;
receive the data of the corresponding identified input type for modifying the content-editing view at the device from the application on the portable computing device; and
provide, for display at the device, the data of the corresponding identified input type for modifying the content-editing view.

2. The device of claim 1, wherein the at least one processor is further configured to:
discover the one or more other devices including the portable computing device; and
identify, by the content-editor application, the plurality of input types that are obtainable using the plurality of available features, at least two of the plurality of input types corresponding to one of the plurality of available features.

3. The device of claim 2, wherein the content-editor application is configured to generate the plurality of selectable options based on the plurality of types of input.

4. The device of claim 1, further comprising an available component, wherein the at least one processor is further configured to advertise a feature flag for use of the available component for providing data to the portable computing device.

5. The device of claim 4, wherein the available component comprises a camera, a touch screen, a stylus, a light sensor, a motion sensor, an activity sensor, or a location sensor.

6. The device of claim 1, wherein the data comprises an image, a video, augmented reality content, image markup metadata, handwriting recognition data, or freehand sketch data.

7. The device of claim 1, wherein the application is a camera application and the data of the corresponding identified input type comprises image data that is received without execution of the content-editor application on the portable computing device, and wherein the device and the portable computing device are associated with a common user account with a remote server.

8. The device of claim 1, wherein the at least one processor is further configured to:
identify the one or more other devices by obtaining, a list of other devices that are communicatively coupled to the device, the list including an indication of the one or more available features of each of the other devices; and
sort, with the content-editor application, the other devices into a group of the other devices for each of the identified input types, wherein:
the plurality of selectable options include an option to obtain data of the image input type from any of a group of the other devices for the image input type, and
the selection of the one option includes a selection of the portable computing device from the group of the other devices for the image input type.

9. The device of claim 1, wherein the application is associated with a camera of the portable computing device, and wherein the plurality of applications include a drawing entry application associated with a stylus of the portable computing device, a handwriting recognition application, or an image markup application.

10. The device of claim 1, wherein the content-editing view comprises a representation of a document in a word processing application.

11. The device of claim 1, wherein the content-editor application comprises a word processor, a presentation editor, an email editor, a spreadsheet, an image editing application, or a messaging application.

12. The device of claim 1, wherein receiving the image data comprises:
generating commands, with the content-editor application, for operating a component of the portable computing device to generate the data of the corresponding identified input type for insertion; and
providing the generated commands to the portable computing device with communications circuitry of the device.

13. The device of claim 1, wherein receiving the data comprises:
calling, from the content-editor application of the device to an application programming interface of the device, a function for requesting the data of the corresponding identified input type; and
providing, via the application programming interface and responsive to the calling of the function, commands for operating a component of the portable computing device to generate the data of the corresponding identified input type for insertion.

14. The device of claim 1, wherein the at least one processor is further configured to:
receive real-time preview data at the device from the activated application on the portable computing device;
provide, for display at the device in the content-editing view of the content-editor application, the real-time preview data; and
provide, for display, at least one modification to the real-time preview data.

15. The device of claim 14, wherein the at least one modification comprises handwritten markup added to the real-time preview data at the portable computing device.

16. A non-transitory computer-readable medium comprising instructions, which when executed by at least one computing device, cause the at least one computing device to perform operations comprising:
identifying one or more other devices that are separate from and communicatively coupled to the at least one computing device, the one or more other devices comprising a remote device that stores a plurality of applications that can be run at the remote device;
identifying one or more available features of each of the one or more other devices, including a plurality of available features of the remote device;
identifying a plurality of input types including an image input type, that can be provided by the plurality of available features of the remote device;
providing, by the at least one computing device and for display, a content-editing view of a content-editor application, the content-editing view including one or more selectable options for insertion of content into the content-editing view, wherein the one or more selectable options include a plurality of selectable options that each correspond to one of the plurality of identified input types that can be provided by the plurality of available features of the remote device;
receiving, from within the content-editor application, a selection of one option of the plurality of selectable options to obtain content of the corresponding identified input type from the remote device;
activating, with the content-editor application, an application of the plurality of applications on the remote device, the application corresponding to the one option of the plurality of selectable options and to the corresponding identified input type;
receiving the content of the corresponding identified input type for insertion into the content-editing view at the at least one computing device, with the content-editor application from the application on the remote device; and
providing, for display at the at least one computing device, the content of the corresponding identified input type for modifying the content-editing view.

17. The non-transitory computer-readable medium of claim 16, wherein activating the application on the remote device comprises activating a camera application outside of a lockscreen of the remote device.

18. The non-transitory computer-readable medium of claim 17, wherein the operations further comprise inserting the content by controlling a component of the remote device with the remote device or with the content-editor application.

19. A method comprising:
identifying, by a device, one or more other devices that are separate from and communicatively coupled to the device, the one or more other devices comprising a portable computing device that stores a plurality of applications that can be run at the portable computing device;
identifying, by the device, one or more available features of each of the one or more other devices, including a plurality of available features of the portable computing device;
identifying a plurality of input types including an image input type, that can be provided by the plurality of available features of the portable computing device;
providing, by the device and for display, a content-editing view of a content-editor application, the content-editing view including one or more selectable options for modifying the content-editing view, wherein the one or more selectable options include a plurality of selectable options that each correspond to one of the plurality of identified input types that can be provided by the plurality of available features of the portable computing device;
receiving, via the content-editor application, a selection of one option of the plurality of selectable options to obtain data of the corresponding identified input type from the portable computing device;
activating, via the content-editor application, an application of the plurality of applications on the portable computing device, the application corresponding to the one option of the plurality of selectable options and to the corresponding identified input type;
receiving the data of the corresponding identified input type for modifying the content-editing view at the device from the application on the portable computing device; and
providing, for display at the device, the data of the corresponding identified input type for modifying the content-editing view.

20. The method of claim 19, further comprising:
discovering the one or more other devices including the portable computing device;
and
identifying, by the content-editor application, the plurality of input types that are obtainable using the more plurality of available features, at least two of the plurality of input types corresponding to one of the plurality of available features.

21. The method of claim 20, further comprising:
prior to providing the plurality of selectable options, communicatively coupling the device and the portable computing device using both a near field communications channel and a direct WiFi channel.

22. The method of claim 19, further comprising:
advertising a feature flag for use of an available component for providing data to the portable computing device.

* * * * *

UNITED STATES PATENT AND TRADEMARK OFFICE
CERTIFICATE OF CORRECTION

PATENT NO. : 11,074,116 B2
APPLICATION NO. : 16/147482
DATED : July 27, 2021
INVENTOR(S) : John O. Louch et al.

Page 1 of 1

It is certified that error appears in the above-identified patent and that said Letters Patent is hereby corrected as shown below:

In the Claims

Column 28, Line 11 (Claim 8), "obtaining, a list" should read --obtaining a list--;

Column 28, Line 39 (Claim 12), Remove "image" after --receiving the--;

Column 30, Line 43 (Claim 20), Remove "more" after --using the--.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*